US011801604B2

United States Patent
Yi et al.

(10) Patent No.: US 11,801,604 B2
(45) Date of Patent: Oct. 31, 2023

(54) ROBOT OF ESTIMATING DIRECTION BASED ON VANISHING POINT OF LOW LUMINANCE IMAGE AND METHOD ESTIMATING THEREOF

(71) Applicant: LG ELECTRONICS INC., Seoul (KR)

(72) Inventors: Dong-Hoon Yi, Seoul (KR); Jaewon Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 793 days.

(21) Appl. No.: 16/652,401

(22) PCT Filed: May 8, 2019

(86) PCT No.: PCT/KR2019/005506
§ 371 (c)(1),
(2) Date: Mar. 30, 2020

(87) PCT Pub. No.: WO2019/231127
PCT Pub. Date: Dec. 5, 2019

(65) Prior Publication Data
US 2020/0282566 A1    Sep. 10, 2020

(30) Foreign Application Priority Data
Jun. 1, 2018  (KR) .................. 10-2018-0063666

(51) Int. Cl.
*B25J 9/16*    (2006.01)
*B25J 13/08*    (2006.01)
(Continued)

(52) U.S. Cl.
CPC ............ *B25J 9/1697* (2013.01); *B25J 9/161* (2013.01); *B25J 9/1664* (2013.01); *B25J 9/1684* (2013.01);
(Continued)

(58) Field of Classification Search
USPC .................................................. 700/245–264
See application file for complete search history.

(56) References Cited

U.S. PATENT DOCUMENTS 5,579,444 A * 11/1996 Dalziel .................. B25J 9/1697
382/153
9,519,286 B2 * 12/2016 Lacaze .................. G05D 1/0038
(Continued)

FOREIGN PATENT DOCUMENTS

| EP | 3371671 B1 * 10/2020 | ............. G01C 21/32 |
| KR | 100749923 | 6/2007 |

(Continued)

OTHER PUBLICATIONS

Yi DH, Lee TJ, Cho DD. A New Localization System for Indoor Service Robots in Low Luminance and Slippery Indoor Environment Using Afocal Optical Flow Sensor Based Sensor Fusion. Sensors (Basel). Jan. 10, 2018;18(1):171. doi: 10.3390/S18010171. PMID: 29320414; PMCID: PMC5795470. (Year: 2018).*
(Continued)

*Primary Examiner* — Jonathan L Sample
(74) *Attorney, Agent, or Firm* — LEE, HONG, DEGERMAN, KANG & WAIMEY PC

(57) ABSTRACT

The present invention relates to a robot and method for estimating an orientation on the basis of a vanishing point in a low-luminance image, and the robot for estimating an orientation on the basis of a vanishing point in a low-luminance image according to an embodiment of the present invention includes a camera unit configured to capture an image of at least one of a forward area and an upward area of the robot and an image processor configured to extract line segments from a first image captured by the camera unit by applying histogram equalization and a rolling guidance filter to the first image, calculate a vanishing point on the
(Continued)

basis of the line segments, and estimate a global angle of the robot corresponding to the vanishing point.

17 Claims, 16 Drawing Sheets

(51) Int. Cl.
  *B25J 19/02* (2006.01)
  *B25J 19/04* (2006.01)
  *A47L 9/00* (2006.01)
  *B25J 11/00* (2006.01)
(52) U.S. Cl.
  CPC ............. *B25J 13/08* (2013.01); *B25J 19/021* (2013.01); *B25J 19/04* (2013.01); *A47L 9/009* (2013.01); *A47L 2201/04* (2013.01); *B25J 11/0085* (2013.01)

(56) References Cited

U.S. PATENT DOCUMENTS

| | | | | |
|---|---|---|---|---|
| 9,757,859 | B1* | 9/2017 | Kolb | B25J 5/007 |
| 10,059,003 | B1* | 8/2018 | Linnell | B25J 9/1664 |
| 2006/0039587 | A1* | 2/2006 | Yoon | G06V 40/162 |
| | | | | 382/115 |
| 2008/0215184 | A1* | 9/2008 | Choi | G06V 20/10 |
| | | | | 901/47 |
| 2010/0053569 | A1* | 3/2010 | Furui | H04N 9/3185 |
| | | | | 353/121 |
| 2010/0315505 | A1* | 12/2010 | Michalke | G06T 7/251 |
| | | | | 348/118 |
| 2012/0162415 | A1* | 6/2012 | Wu | H04N 7/18 |
| | | | | 348/142 |
| 2012/0197464 | A1* | 8/2012 | Wang | G06F 3/04842 |
| | | | | 701/28 |
| 2012/0212627 | A1* | 8/2012 | Klose | H04N 9/3185 |
| | | | | 348/189 |
| 2015/0217449 | A1* | 8/2015 | Meier | G05D 1/0088 |
| | | | | 901/1 |
| 2016/0063706 | A1* | 3/2016 | Gonzalez-Banos | G06T 7/73 |
| | | | | 348/222.1 |
| 2016/0144505 | A1* | 5/2016 | Fong | G05D 1/0274 |
| | | | | 700/250 |
| 2016/0144511 | A1* | 5/2016 | Romanov | G05D 1/0253 |
| | | | | 701/28 |
| 2016/0147230 | A1* | 5/2016 | Munich | G05D 1/0246 |
| | | | | 701/28 |
| 2016/0267720 | A1* | 9/2016 | Mandella | G06F 3/03545 |
| 2016/0271795 | A1* | 9/2016 | Vicenti | B25J 9/163 |
| 2017/0069092 | A1* | 3/2017 | Bell | G06V 10/52 |
| 2017/0097643 | A1* | 4/2017 | Munich | B25J 19/005 |
| 2017/0113342 | A1* | 4/2017 | Abramson | B25J 9/0003 |
| 2018/0060669 | A1* | 3/2018 | Pham | G06T 7/80 |
| 2018/0082132 | A1* | 3/2018 | Spampinato | G06V 20/58 |
| 2018/0276844 | A1* | 9/2018 | Takahashi | G06T 7/70 |

FOREIGN PATENT DOCUMENTS

| | | |
|---|---|---|
| KR | 20070108815 | 11/2007 |
| KR | 20100098999 | 9/2010 |
| KR | 20110039037 | 4/2011 |
| KR | 20140087485 | 7/2014 |
| KR | 20180040314 | 4/2018 |

OTHER PUBLICATIONS

Yi, et al., "Localization in Low Luminance, Slippery Indoor Environment Using Afocal Optical Flow Sensor and Image Processing", Dept. of Electrical and Computer Engineering, Graduate School, Seoul National University, Aug. 2017, 98 pages.

Yi, et al., "A New Localization System for Indoor Service Robots in Low Luminance and Slippery Indoor Environment Using Afocal Optical Flow Sensor Based Sensor Fusion", Department of Electrical and Computer Engineering, Seoul National University, Sensors 2018, 18, 171; doi:10.3390/ s18010171, www.mdpi.com/journal/sensors, 14 pages.

* cited by examiner

FIG. 9
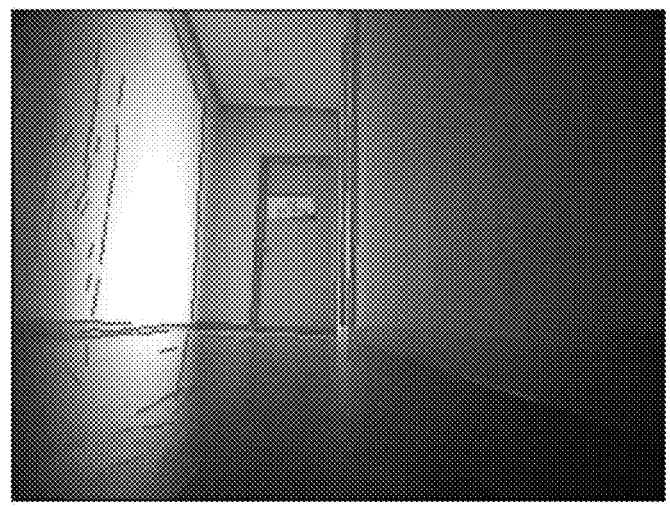
61
62

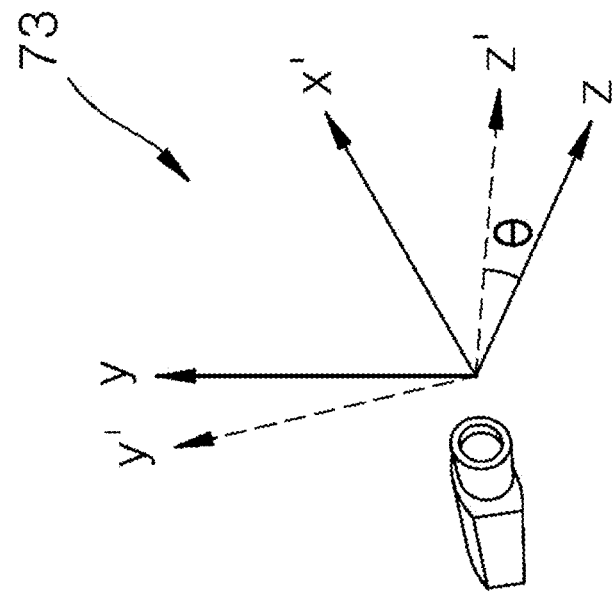
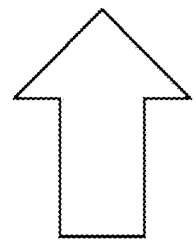
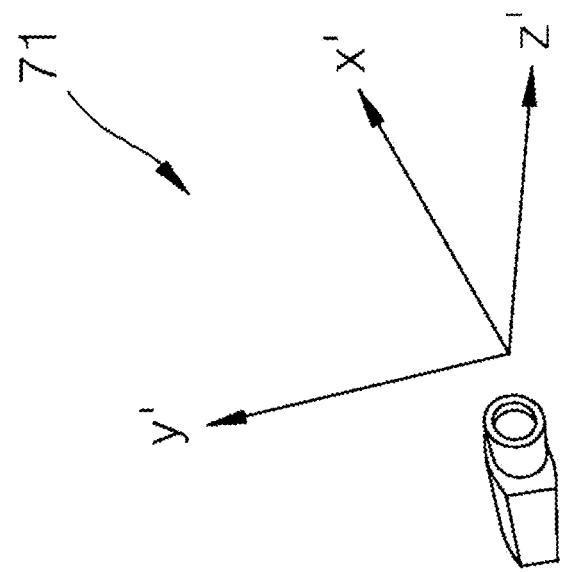
FIG. 13

FIG. 14
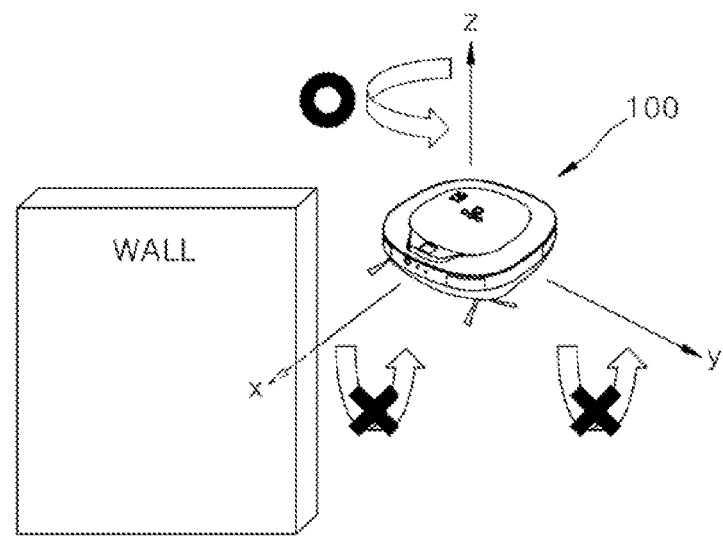
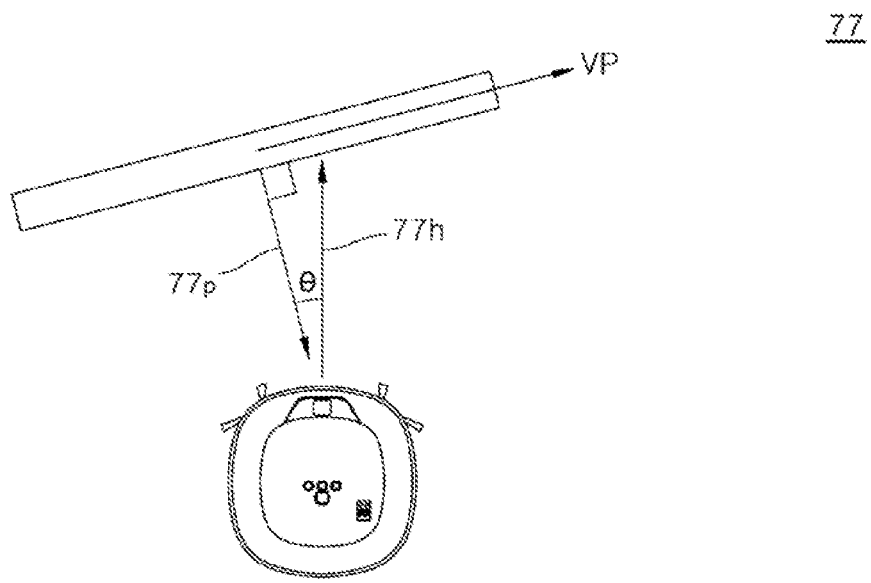

FIG. 15
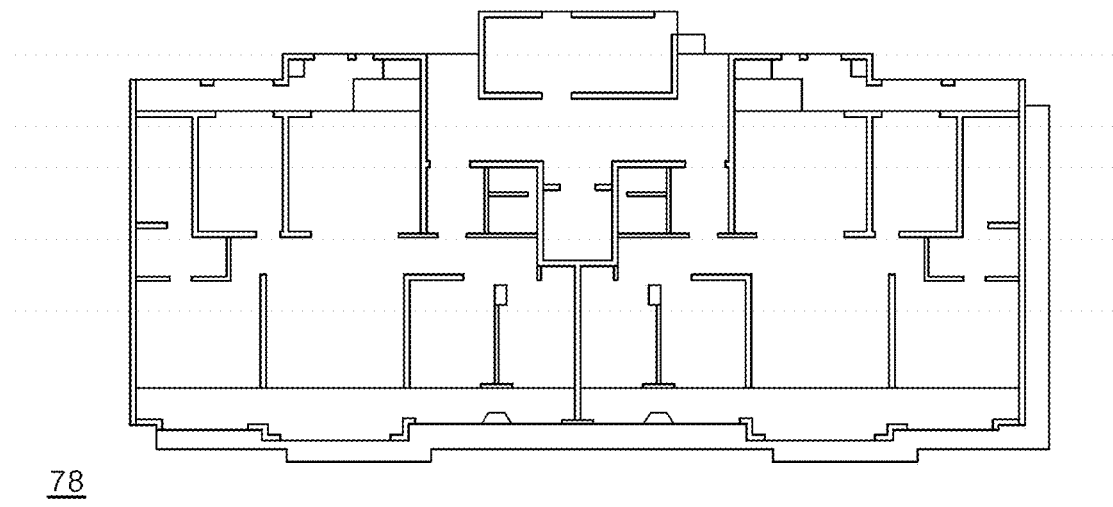
78
79
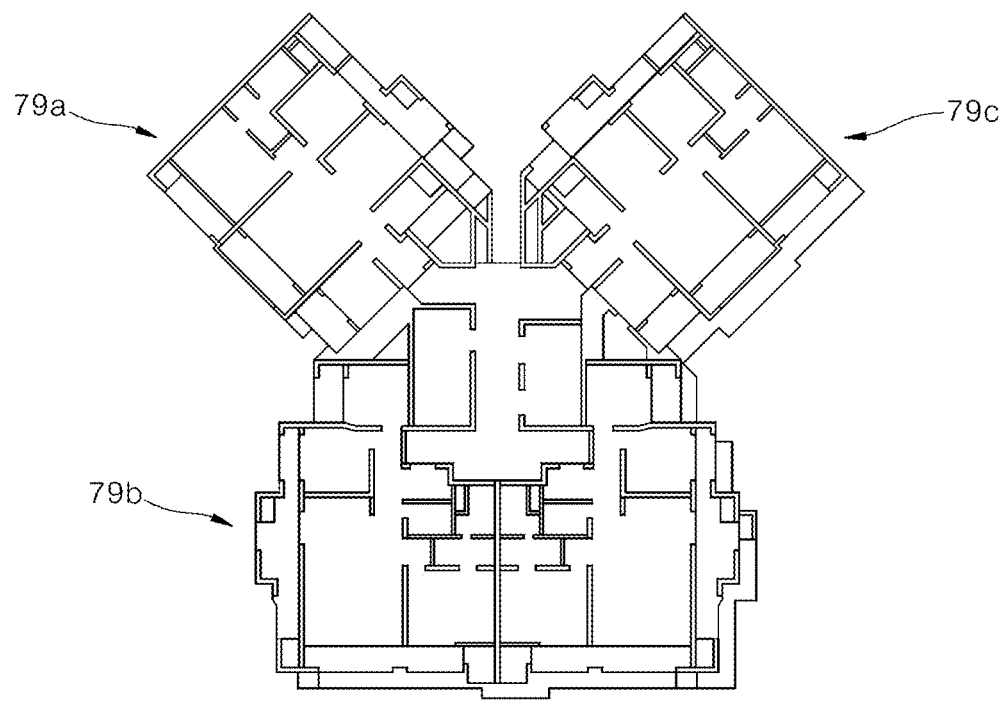

ROBOT OF ESTIMATING DIRECTION BASED ON VANISHING POINT OF LOW LUMINANCE IMAGE AND METHOD ESTIMATING THEREOF

CROSS-REFERENCE TO RELATED APPLICATIONS

This application is the National Stage filing under 35 U.S.C. 371 of International Application No. PCT/KR2019/005506, filed on May 8, 2019, which claims the benefit of earlier filing date and right of priority to Korean Application No. 10-2018-0063666, filed on Jun. 1, 2018, the contents of which are all incorporated by reference herein in their entirety.

TECHNICAL FIELD

The present invention relates to a robot and method for estimating an orientation on the basis of a vanishing point in a low-luminance image.

BACKGROUND ART

To operate in a space such as an airport, school, public office, hotel, office, factory, apartment, or house, a robot needs to find its location and determine a direction of movement. However, while the robot is moving, the azimuth thereof is changed, or it is not possible to accurately identify the location. For this reason, various techniques have been proposed.

Korean Patent No. 10-0749923 discloses a process in which a robot photographs an external mark through a camera and calculates the location thereof on the basis of the mark to accurately determine its orientation. This is described in detail with reference to FIG. 1.

FIG. 1 is a diagram showing a process of calculating the location and orientation of a robot for traveling of the robot. A wireless receiving module attached to a robot receives an identification (ID) of a mark, and a camera equipped with an infrared filter photographs the mark (S1). A binary search method is used on the captured image to detect two marks (S2). In an embodiment of S2, a search based on the binary search method is repeated to detect two marks.

The location and orientation of the moving robot are calculated by using the two detected marks (S3). The location and orientation of the moving robot are calculated in different ways according to a state of the robot. When the location of the robot is calculated, the location of a new mark in a work space is calculated (S4), and the mark is set as a node for generating a topology map so that a topology map is built (S5). Then, traveling of the robot is controlled by using the built topology map (S6).

According to the process of FIG. 1, the camera photographs an external mark to identify the location, and the location and orientation are calculated from the photographed mark. This requires marks which are attached in advance so that the robot may photograph an external mark, but it is difficult to install such marks in every space. In addition, when the robot photographs a mark, any external hindrance should be removed, but it is not possible to surely remove such a hindrance from a space with a transient population.

In particular, luminance in a space should be a certain level or higher to identify the location with a camera. In a low-luminance environment, however, it is difficult for the robot to capture an image, and accordingly the robot cannot clearly identify the location.

Consequently, a method is necessary for a robot to identify a current orientation in a moving process.

DISCLOSURE

Technical Problem

The present disclosure is directed to enabling a robot to estimate an orientation by using an image captured in a low-luminance environment.

The present disclosure is directed to enabling a robot to extract line segments from an image captured in a low-luminance environment and estimate the orientation of the robot on the basis of a vanishing point.

The present disclosure is directed to enabling a robot to check an image of the floor and correct a location error caused by a change in a material even in a low-luminance condition.

Objectives of the present invention are not limited to those mentioned above, and other objectives and advantages of the present invention which have not been mentioned will be understood from the following descriptions and become more apparent by embodiments of the present invention. Also, it may be easily understood that the objectives and advantages of the present invention may be realized by means stated in the claims and combinations thereof.

Technical Solution

One aspect of the present invention provides a robot for estimating an orientation on the basis of a vanishing point in a low-luminance image, the robot including a camera unit configured to capture an image of at least one of a forward area and an upward area of the robot, and an image processor configured to extract line segments from a first image captured by the camera unit by applying histogram equalization and a rolling guidance filter to the first image, calculate a vanishing point on the basis of the line segments, and estimate a global angle of the robot corresponding to the vanishing point.

Another aspect of the present invention provides a method for a robot to estimate an orientation on the basis of a vanishing point in a low-luminance image, the method including applying, by an image processor, histogram equalization and an rolling guidance filter to a first image captured by a camera unit to extract line segments from the first image, and calculating, by the image processor, a vanishing point by using the line segments and estimating a global angle of the robot corresponding to the vanishing point.

Advantageous Effects

When embodiments of the present invention are used, a robot can estimate the orientation thereof through an image even in a low-luminance condition.

Also, when embodiments of the present invention are used, a robot can estimate the orientation on the basis of the angle of a vanishing point even in a multi-Manhattan frame structure.

Further, when embodiments of the present invention are used, it is possible to detect a change of a floor material in a low-luminance condition and correct a location error of a robot.

Effects of the present invention are not limited to those mentioned above, and those of ordinary skill in the art may easily derive various effects of the present invention from a constitution of the present invention.

DESCRIPTION OF DRAWINGS

FIG. 9 is a set of views showing a process of deleting unnecessary line segments according to an embodiment of the present invention.

FIGS. 12 and 13 are diagrams showing a process of estimating a global angle on the basis of a vanishing point according to an embodiment of the present invention.

FIG. 14 is a set of diagrams showing an azimuth estimation process according to an embodiment of the present invention.

FIG. 15 is a set of diagrams showing examples of a space in which a robot of the present invention moves.

MODES OF THE INVENTION

Figure 1:
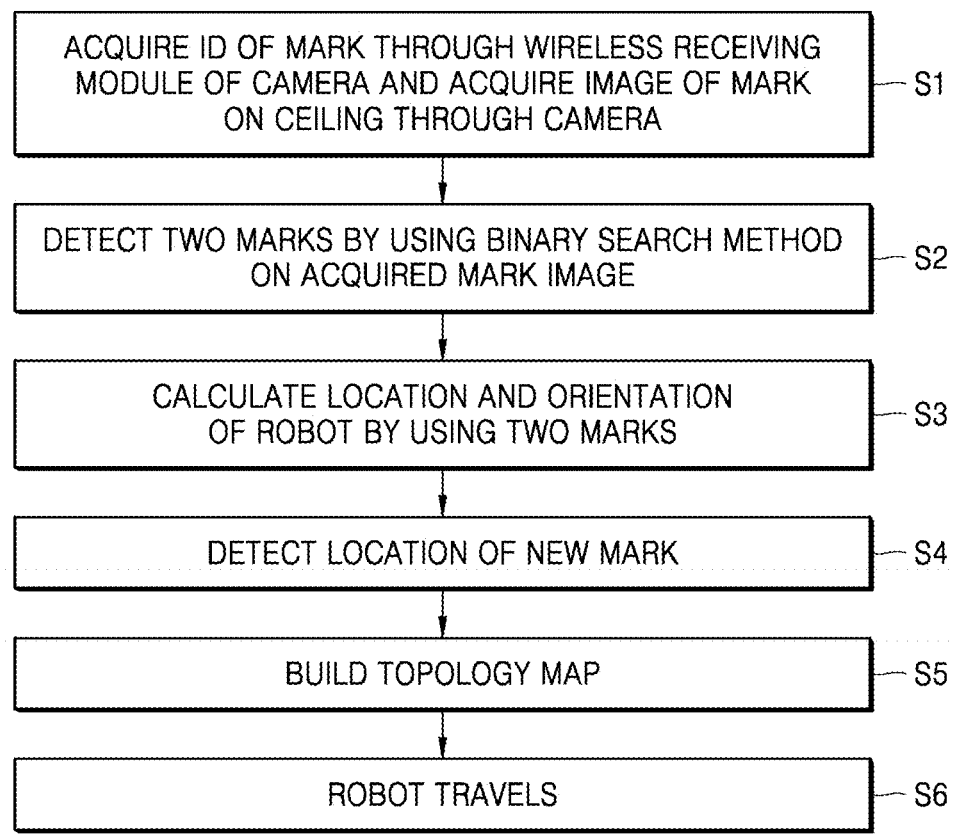
FIG. 1 is a flowchart showing a process of calculating the location and orientation of a robot for traveling of the robot.

Hereinafter, exemplary embodiments of the present invention will be described in detail with reference to the accompanying drawings so that those of ordinary skill in the art to which the present invention pertains may readily implement the present invention. The present invention may be embodied in various different forms and is not limited to the embodiments set forth herein.

To clearly describe the present invention, parts that are irrelevant to the description will be omitted, and the same or similar elements will be designated by the same reference numerals throughout the specification. Also, some embodiments of the present invention will be described in detail with reference to exemplary drawings. In adding reference numerals to elements, identical elements are referred to by the same reference numeral as possible even when the elements are depicted in different drawings. In describing the present invention, when it is determined that the detailed description of a known art related to the present invention may obscure the gist of the present invention, the detailed description will be omitted.

In describing elements of the present invention, terms such as first, second, A, B, (a), and (b) may be used. The terms are used to just distinguish an element from other elements and the essence, sequence, or order of the element is not limited by the terms. When it is described that any element is "connected," "coupled," or "linked" to another element, it should be understood that the element may be directly connected or linked to the other element, but another element may be "interposed" between the elements, or the elements are "connected" "coupled," or "linked" through another element.

Also, in embodying the present invention, elements may be subdivided for convenience of description. However, the subdivided elements may be implemented in one device or module, or one element may be implemented in multiple devices or modules in a distributed manner.

In this specification, a robot includes an apparatus which moves while having a specific purpose (cleaning, security, monitoring, guide, etc.) or providing a function according to characteristics of a space in which the robot moves. Therefore, a robot collectively refers to apparatuses that includes a means of travel capable of moving using predetermined information and a sensor and provides a predetermined function.

As described above with reference to FIG. 1, a robot may capture an external image, infer current location information, and set a travel route to identify the location thereof. Here, a space in which the robot moves may be diversely changed in brightness according to an illumination state, the amount of incident external light, and the like. In the case of high luminance, a camera combined with the robot may capture an image. However, when the robot photographs the outside thereof in a low-luminance condition, image quality is limited. Therefore, a method is necessary for a robot to identify a current location even in a low-luminance condition.

To this end, this specification provides a method for a robot to correct an azimuth robustly even in a low-luminance environment of 10 lux (lx) or less where it is difficult for conventional image-based simultaneous localization and mapping (SLAM) to operate.

In location awareness, a robot location error caused by a robot azimuth error has greater influence than a location error caused by a travel distance error. According to a related art, a location is estimated by extracting keypoints as shown in FIG. 1. However, in the case of low luminance, keypoints are not extracted from an image, and thus vision SLAM does not operate.

Accordingly, provided is a method for a robot to correct the azimuth by processing even an image captured in a dark space, that is, an image captured in a low-luminance condition (a low-luminance image). When the overall brightness of a low-luminance image is adjusted to be high through histogram equalization or a Retinex algorithm, image noise is amplified, and it is difficult to extract keypoints.

To solve this problem, according to this specification, a robot makes image boundaries distinct while removing noise and then recognizes a spatial structure by extracting a vanishing point in the image. Also, provided is a method for a robot to correct an angle error caused by a gyro sensor thereof by calculating the angle of the robot with respect to surroundings. A robot may use various filters to remove noise, and in this specification, rolling guidance filtering may be used as an embodiment of a filter.

In an image captured in a dark space, it may be difficult to distinguish among a wall, a floor, and a ceiling. In particular, in the case of SLAM which operates on the basis of keypoints, a location error increases when objects disposed in a space or a spatial shape has a small number of keypoints, surroundings are dark, or the robot slips.

This causes problems in that the capability of sensing an object through a camera is limited according to luminance in a general indoor environment, and a distance or the number of types of objects that can be sensed by a robot in a weak light condition is reduced. For this reason, when a robot travels in a dark place, the robot may slip because it is not possible to sense a change in the floor, such as a carpet, a doorsill, and tiles. Also, for this reason, it is difficult for a robot to measure a travel distance or identify an accurate location.

Accordingly, this specification proposes a configuration and method for ensuring the performance of SLAM of a robot even in an environment with low luminance.

Figure 2:
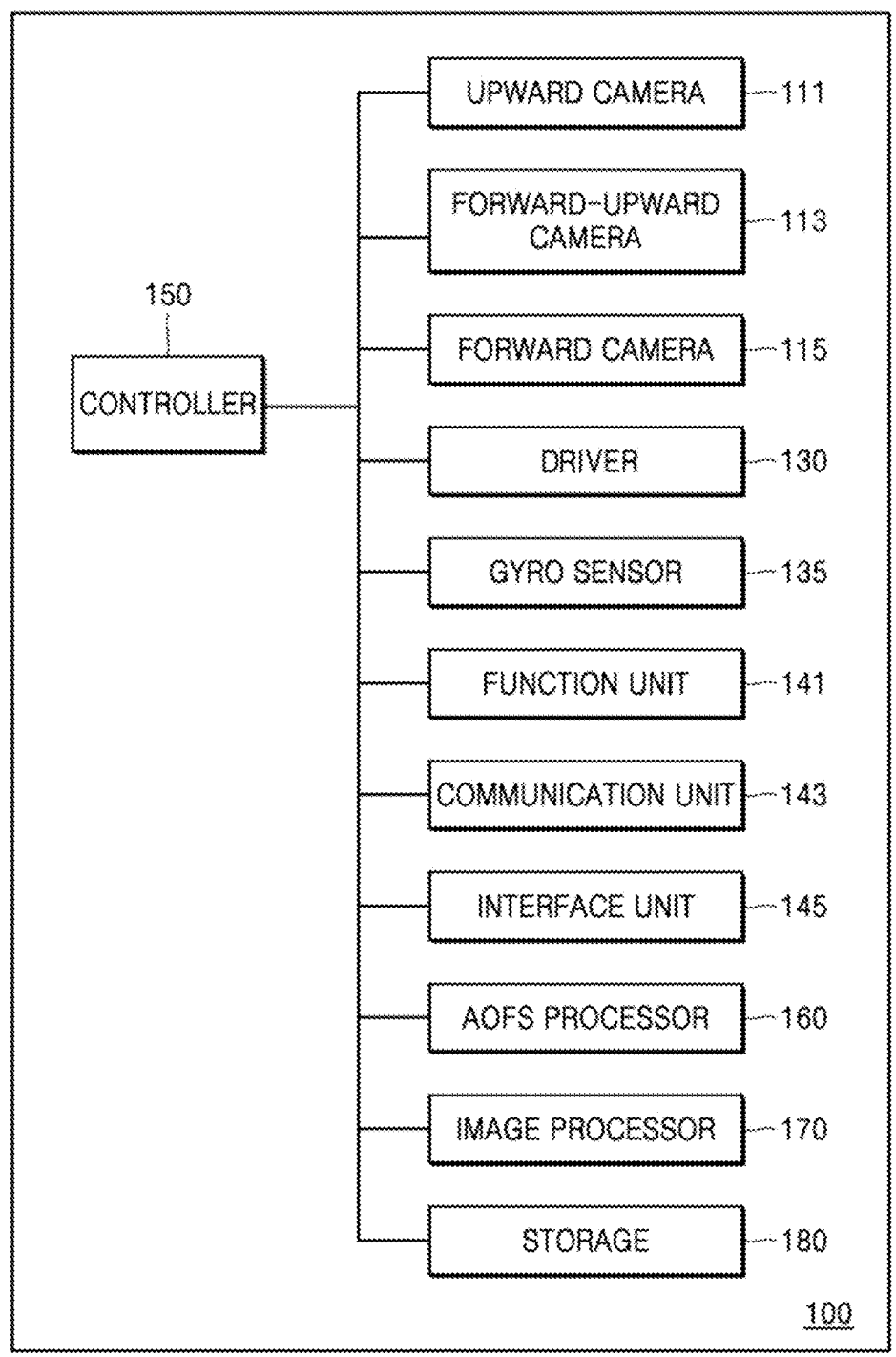
FIG. 2 is a block diagram showing a configuration of a robot 100 according to an embodiment of the present invention.

FIG. 2 is a block diagram showing a configuration of a robot 100 according to an embodiment of the present invention. In FIG. 2, the robot includes three cameras. In an embodiment, an upward camera 111, a forward-upward camera 113, and a forward camera 115 are included. These cameras capture an image of at least one of forward and upward areas of the robot.

Also, the robot 100 includes a driver 130 which provides a means for the robot to move and moves the robot and a gyro sensor 135 which recognizes a change in the orientation of the robot. A function unit 141 which provides functions so that the robot 100 may perform specific functions (cleaning, security, guide, etc.), a communication unit 143 which communicates with other devices, and an interface unit 145 which externally outputs audial or visual information may be selectively disposed in the robot.

An afocal optical flow sensor (AOFS) processor 160 enables the robot to check a space to move in a dark place without slipping. The AOFS processor 160 senses a change in a floor material of an area to which the driver 130 moves. Also, the AOFS processor 160 corrects slipping of the robot caused by the change in the floor material to estimate the trace of the robot. This will be described in detail with reference to FIG. 4.

Meanwhile, an image processor 170 improves a dark image by applying a rolling guidance filter and makes it possible to recognize an angle through vanishing point estimation. In other words, the image processor 170 extracts line segments from a first image captured by the camera units 111, 113, and 115 by applying histogram equalization and an rolling guidance filter to the first image. Then, the image processor 170 calculates a vanishing point on the basis of the extracted line segments and estimates a global angle of the robot corresponding to the calculated vanishing point.

A storage 180 stores a vanishing point angle of a landmark in a space in a multi-Manhattan frame structure. Subsequently, the storage 180 may check in which space the robot is located by comparing the vanishing point angle with a vanishing point angle of an image calculated by the robot in a moving process.

A controller 150 of the robot controls these elements and controls the robot to move even in a low-luminance condition. Each element will be described in further detail.

In a dark space, that is, in a low-luminance condition, even when an image captured by the robot is used, a spatial structure is not clearly stored in the image, and the robot is highly unlikely to recognize the spatial structure. Therefore, it is possible to grasp a three-dimensional (3D) space by calculating information on a vanishing point of linear structures on the basis of a characteristic, that is, a linear structure, of a space, and to correct an absolute azimuth.

To sense and correct slipping in a dark area, the AOFS processor 160 solves a problem that may occur in an external condition, such as a carpet or a doorsill, in a hardware manner by applying an AOFS, thereby supporting movement of the robot. In an environment with low luminance in which the robot may slip, it is possible to increase the accuracy of movement by estimating a travel distance.

Also, the image processor 170 may improve a dark image by applying an rolling guidance filter, grasp a 3D space by using horizontal and vertical line segments on the assumption that an indoor environment is a Manhattan world, and then correct the absolute azimuth. As a result, the robot can estimate an angle and improve accuracy in an environment with low luminance in which the robot may slip.

To this end, the robot 100 may acquire an image through the forward-upward camera 113 or the forward camera 115 and process the information.

Unlike FIG. 2, it is possible to separately implement an image processing apparatus composed of only a camera unit (the upward camera 111, the forward-upward camera 113, and the forward camera 115), the image processor 170, and the controller 150. In this case, the image processing apparatus is disposed in the robot to process images. However, the controller 150 may separately communicate with the robot to control the driver 130.

Figure 3:
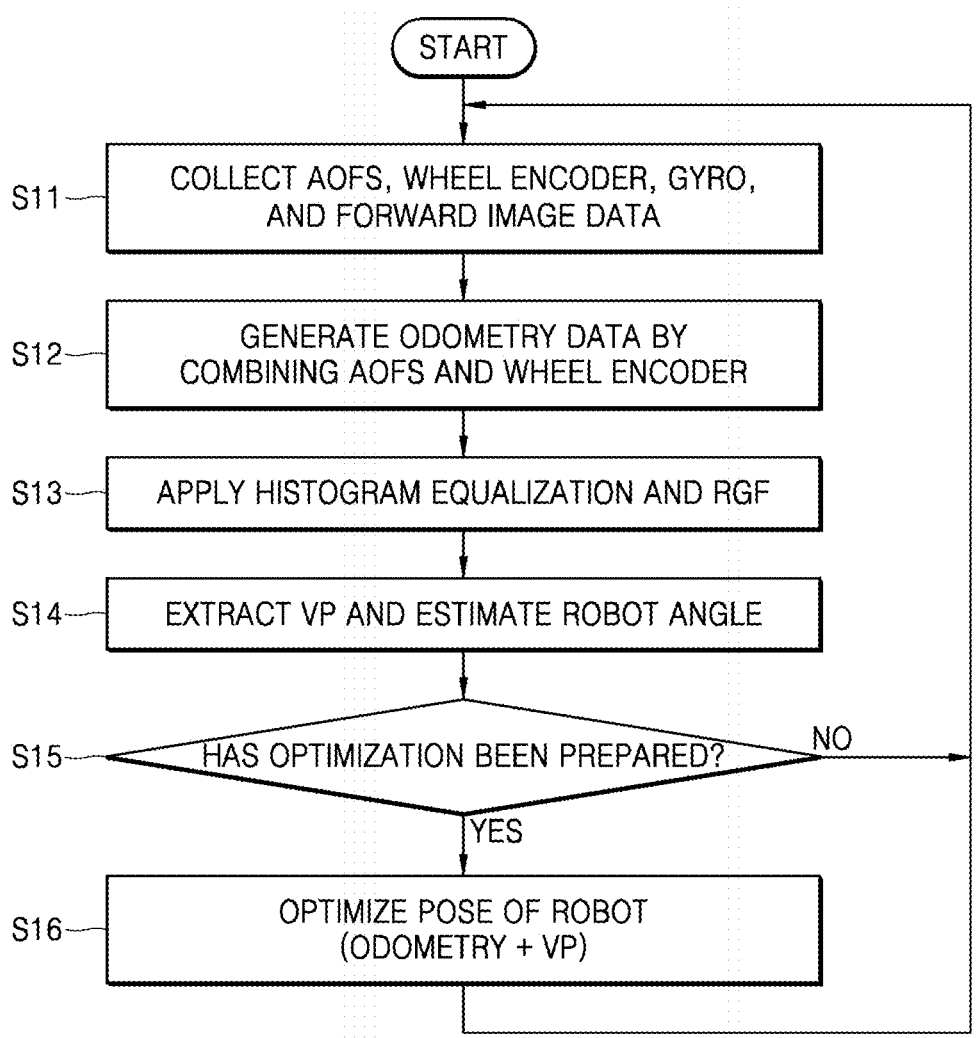
FIG. 3 is a flowchart showing a process of identifying an interior with low luminance and optimizing a route or a current location according to an embodiment of the present invention in a traveling process of a robot.

FIG. 3 is a flowchart showing a process of identifying an interior with low luminance and optimizing a route or current location according to an embodiment of the present invention in a traveling process of a robot. The robot 100 collects information calculated by the AOFS processor 160, data calculated by a wheel encoder, which calculates a travel distance, in a moving process of the driver 130, orientation information sensed by the gyro sensor 135, and forward image data (S11). The controller 150 generates odometry data by combining the information calculated by the AOFS processor 160 and the travel distance information of the wheel encoder together (S12). Also, the image processor 170 applies a histogram equalization algorithm to the forward image data to solve low luminance of the forward image data, removes image noise which is generated in the process, and applies an rolling guidance filter (RGF) to make boundary parts clear (S13).

Subsequently, a vanishing point (VP) is extracted from the adjusted image, and the controller 150 estimates the angle of the robot (S14). To identify the location of the robot on the basis of the estimation result, it is determined whether optimization has been performed (S15). When optimization has been performed, a robot pose is optimized (S16). This may be based on an odometry and the vanishing point. When optimization has not been performed, the process may be performed beginning with step S11.

Figure 4:
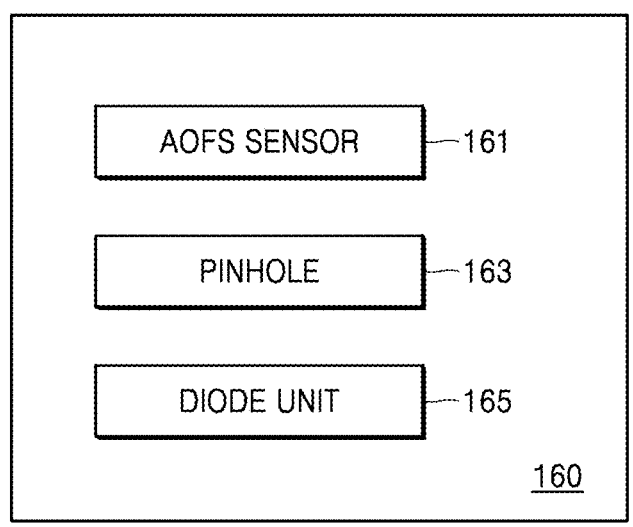
FIG. 4 is a block diagram showing a process in which an afocal optical flow sensor (AOFS) processor accurately estimates a travel distance according to an embodiment of the present invention even in a slippery environment.

FIG. 4 is a block diagram showing a process in which an AOFS processor accurately estimates a travel distance according to an embodiment of the present invention even in a slippery environment.

The AOFS processor 160 may be disposed at a lower end of the robot 100 and sense a change in the material of the lower end. The AOFS processor 160 includes an AOFS 161 and adaptively estimates a travel distance according to a height change on the basis of a difference between images sensed by the sensor when going up on a carpet or a doorsill. The sensor includes a low-resolution camera and a digital signal processing device and estimates a relative displacement of a fine pattern by analyzing consecutive images captured by the camera.

In particular, to improve the accuracy of image processing, the AOFS processor 160 may have a pinhole 163 disposed in the sensor and reduce an error in distance estimation. As a hole of a very small size, the pinhole 163 is disposed between the AOFS 161 and the floor and causes a clear floor image to be input. The pinhole 163 may be disposed close to the AOFS 161. Also, the AOFS processor 160 may selectively include a diode unit 165 including a light-emitting diode so that a floor image may be easily recognized.

The AOFS processor 160 configured as shown in FIG. 4 may correct slipping of the robot caused by a minute change in the floor and accurately estimate the trace of the robot. To this end, it is possible to generate odometry data by using the wheel encoder constituting the driver 130 and the gyro sensor 135.

Next, a process in which the image processor 170 corrects the azimuth of the robot on the basis of a captured image is described. Most indoor spaces have a structure in which straight lines cross at right angles. Therefore, assuming that an indoor space is a Manhattan world, the robot may recognize the space by estimating a vanishing point and may also estimate a relative angle of a camera.

In other words, the image processor 170 may select straight lines which are aligned in three orthogonal directions in a captured image, estimate a vanishing point on the basis of the straight lines, and identify a vertex of the space. However, when the image captured by the image processor 170 is dark, it is not possible to extract straight lines. For this reason, it is not possible to find a vanishing point, and the reliability of vanishing point estimation is degraded.

Accordingly, the image processor 170 facilitates line extraction from the image by applying a histogram equalizer to the captured image. The image processor 170 may extract segments (lines), select only line segments which are highly related to the vanishing point, and thereby increase the reliability of a vanishing point estimation result.

Figure 5:
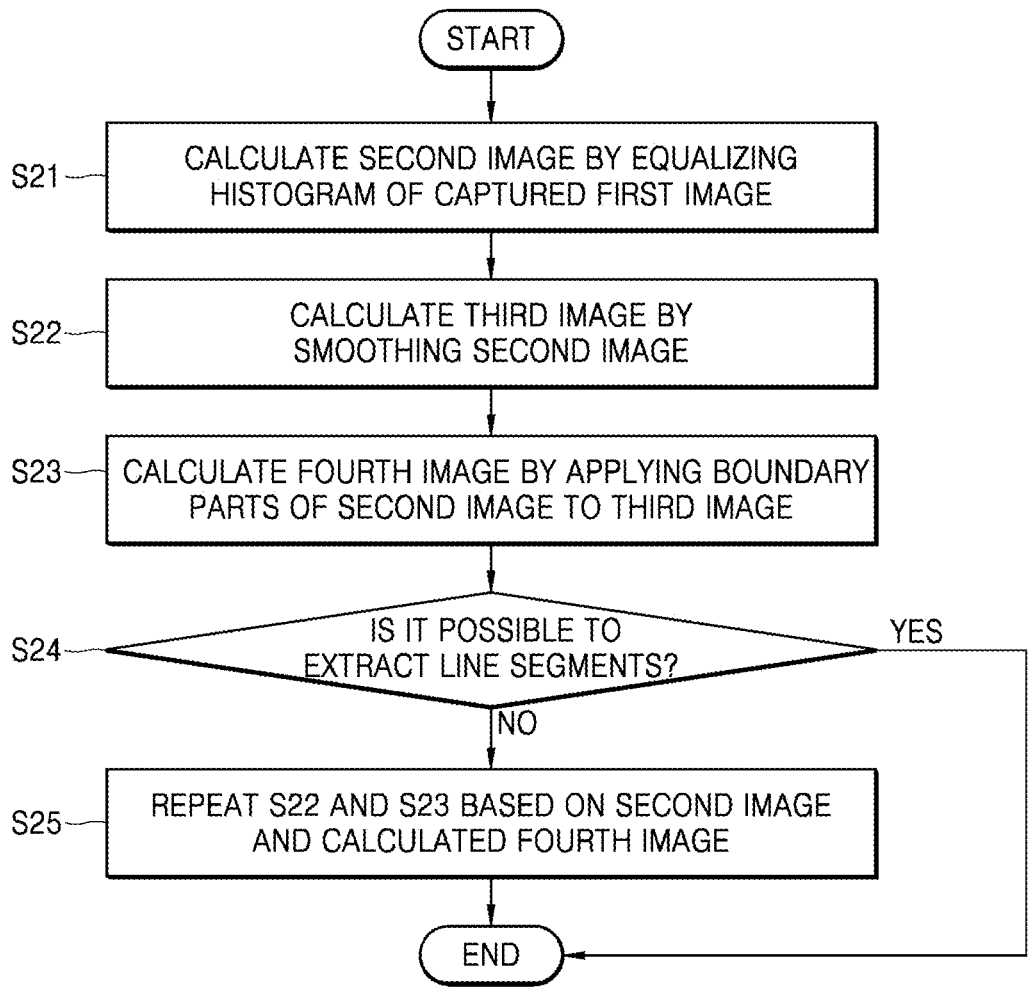
FIG. 5 is a flowchart showing a process in which an image processor processes an image according to an embodiment of the present invention.

FIG. 5 is a flowchart showing a process in which an image processor processes an image according to an embodiment of the present invention. Steps S21 to S25 of FIG. 5 correspond to an embodiment of step S13 of FIG. 3.

A first image is captured through the forward camera 115, the forward-upward camera 113, the upward camera 111, or the like. Since the first image is captured in a low-luminance condition, a dark image is an embodiment thereof. The histogram equalizer denotes equalizing the overall intensity histogram of the first image when the overall image is too dark or bright because the intensity histogram of the image is concentrated in a part of the image. This will be described in further detail with reference to FIG. 6.

When a second image is calculated as a result of histogram equalization, the image processor 170 performs S22 to S24 for applying an RGF to the second image. This is a process of removing image noise generated in the histogram equalization process. Since line segments for finding a vanishing point are important in the present invention, the image processor 170 distinctly highlights boundary parts by converting the second image to find line segments in the second image.

The image processor 170 smoothly processes the second image by applying a Gaussian filter to the second image and thereby calculates a third image (S22). Then, the image processor 170 applies boundary parts of the second image to the third image to emphasize the boundary parts of the second image in the third image and thereby calculates a fourth image (S23). When the second image is applied to the third image which has been smoothed on the whole, the boundary parts are emphasized.

Therefore, the fourth image becomes an image in which boundary parts are distinct. The image processor 170 checks whether it is possible to extract a sufficient number of valid lines (S24). When there are not a sufficient number of valid lines, steps S22 and S23 are repeated on the basis of the second image and the fourth image as shown in S25. When it is possible to extract a sufficient number of valid lines to find a vanishing point, the process is finished.

FIG. 5 is summarized as follows. The image processor 170 generates a second image by equalizing the histogram of a captured first image. Then, the image processor 170 generates an image in which line segments are emphasized by applying an rolling guidance filter to the generated second image. A process of emphasizing line segments is described in detail with reference to FIG. 7.

Figure 6:
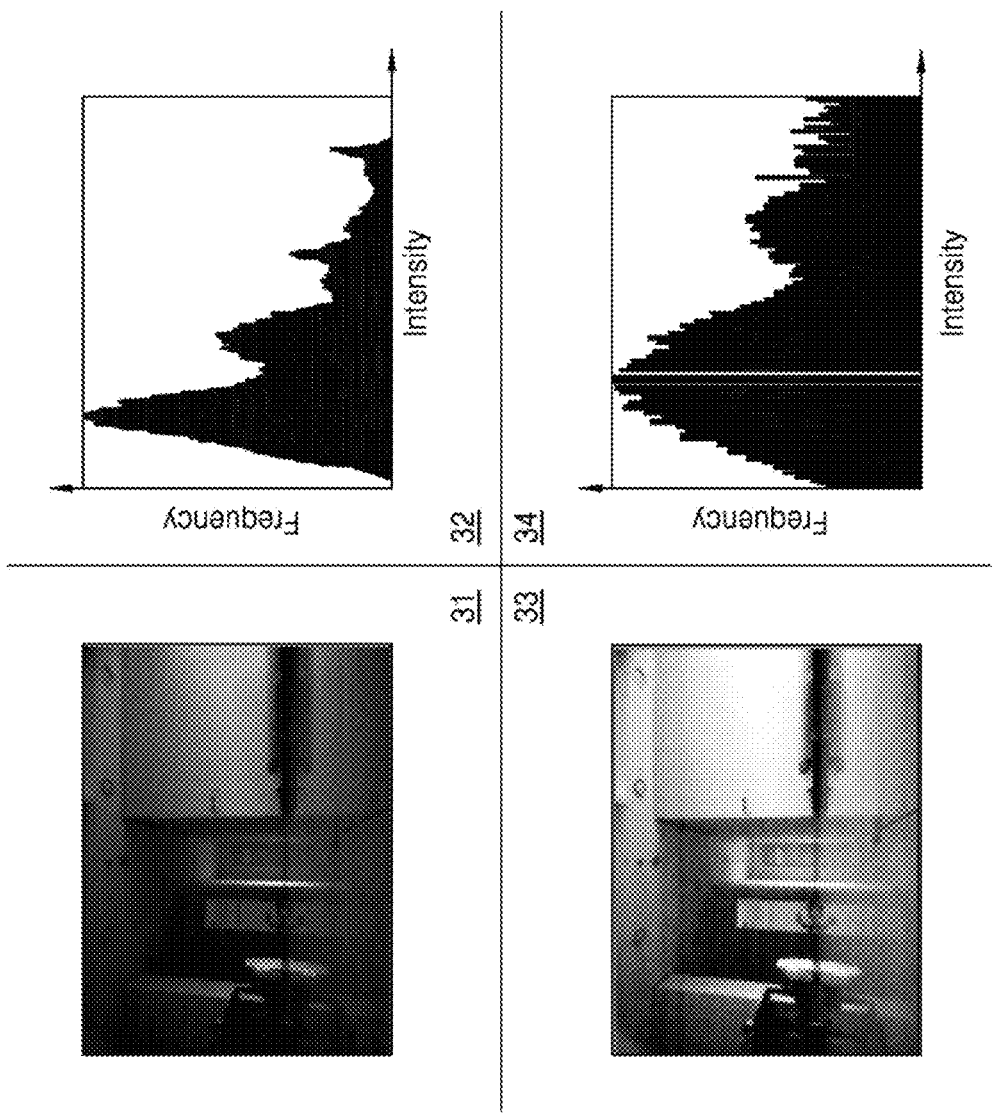
FIG. 6 is a set of views showing histogram equalization results according to an embodiment of the present invention.

FIG. 6 is a set of views showing histogram equalization results according to an embodiment of the present invention. 31 is an image captured by the forward-upward camera 113 of the robot 100, and 32 is an intensity histogram of the image. It is possible to see that intensity is high in specific regions. 33 is an image obtained by equalizing the histogram of the image 31, and it is possible to clearly see objects in the image. 34 is an intensity histogram of the image 33. It is possible to see that intensity is distributed all over the regions compared to intensity in the image 32.

When the image processor 170 processes an image as shown in FIG. 6, objects are made obvious, and it is possible to settle boundaries. However, noise may occur in the image processing process, and thus an rolling guidance filter (RGF) may be applied.

Figure 7:
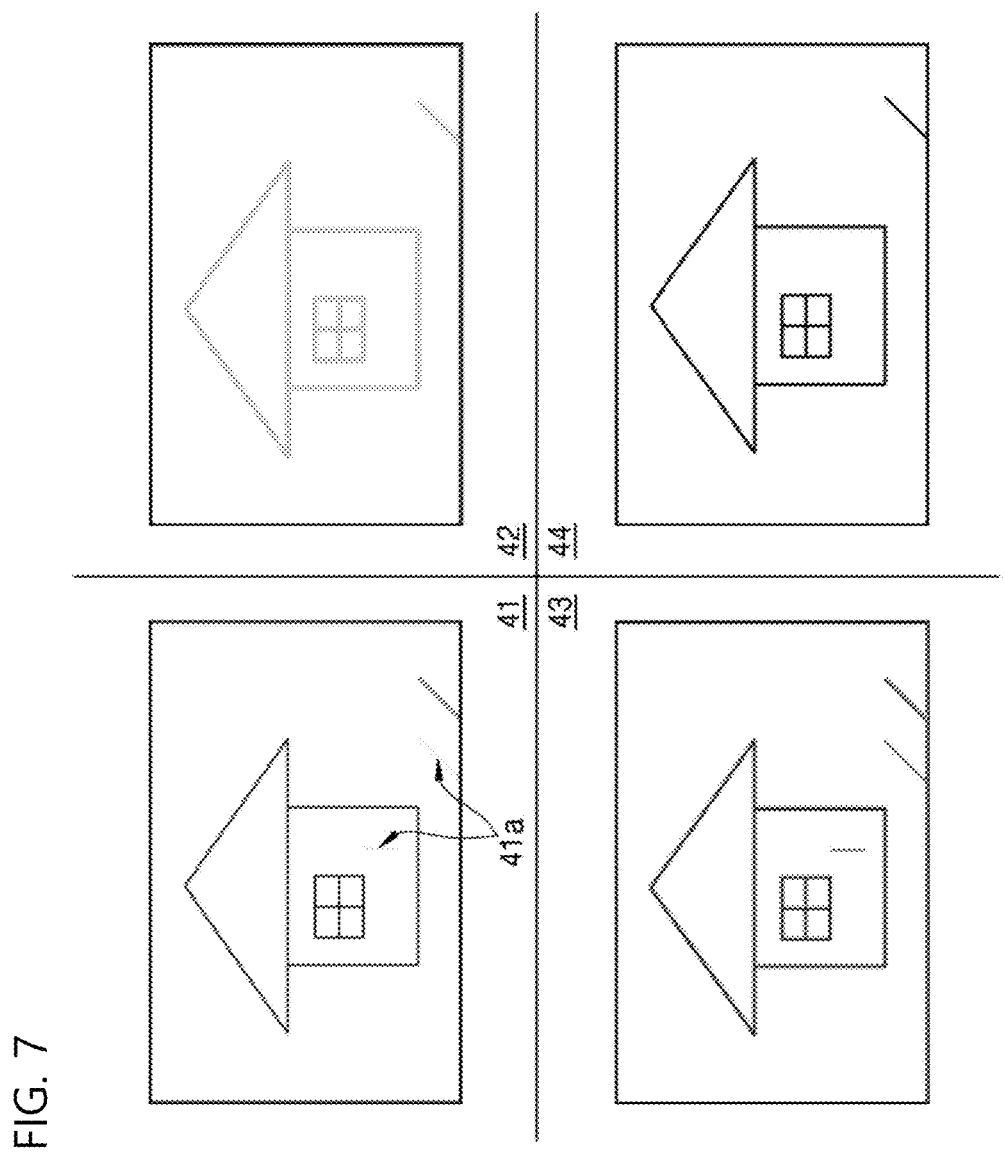
FIG. 7 is a set of diagrams showing a process of applying a rolling guidance filter to clearly calculate boundary lines in an image according to an embodiment of the present invention.

FIG. 7 is a set of diagrams showing a process of applying an rolling guidance filter to clearly calculate boundary lines in an image according to an embodiment of the present invention. 41 is an original image. Alternatively, 41 may be an image to which histogram equalization of FIG. 6 has been applied. In the image, the boundaries of an object are present, but lines may be added in the equalization process due to noise as indicated by 41a. The image processor 170 smooths the image 41 by applying a Gaussian filter to the image 41.

The image processor 170 blurs the overall image using the Gaussian filter. When the original image is applied to the blurred image, boundaries become obvious in edge regions (regions dark colored like line segment regions). The image processor 170 blurs the image in which boundaries have become obvious by applying the Gaussian filter and then applies the original image to the blurred image. Then, the boundaries gradually become obvious, and regions other than the boundaries are gradually blurred. When the Gaussian filter is applied a predetermined number of times or more, the boundary regions become obvious, and it is possible to clearly see line segments in the image.

In the process in which the image processor 170 smooths the image, the lines 41a, such as noise, fade and may be deleted in the image. When the image processor 170 emphasizes boundaries by superimposing the image 41 on the image 42, the image is divided into overlapping parts and non-overlapping parts as shown in an image 43. When only the overlapping parts are emphasized, the lines corresponding to noise are removed, and the boundaries become obvious.

The image processor 170 may perform image processing for emphasizing boundaries, such as designating an image 44 as an original image or applying the image 41 to an image obtained by blurring the image 44, so that only major boundaries may be disposed in the image.

When lines are determined as results of image processing, the image processor 170 may extract a vanishing point on the basis of the lines and correct the angle of the robot on the basis of the vanishing point and angles of the lines.

After converting the image captured in a low-luminance condition into an image from which lines can be extracted, the robot extracts a vanishing point from the image and estimates the angle of the robot on the basis of the vanishing point (S14 of FIG. 3). This will be described in further detail below.

Figure 8:
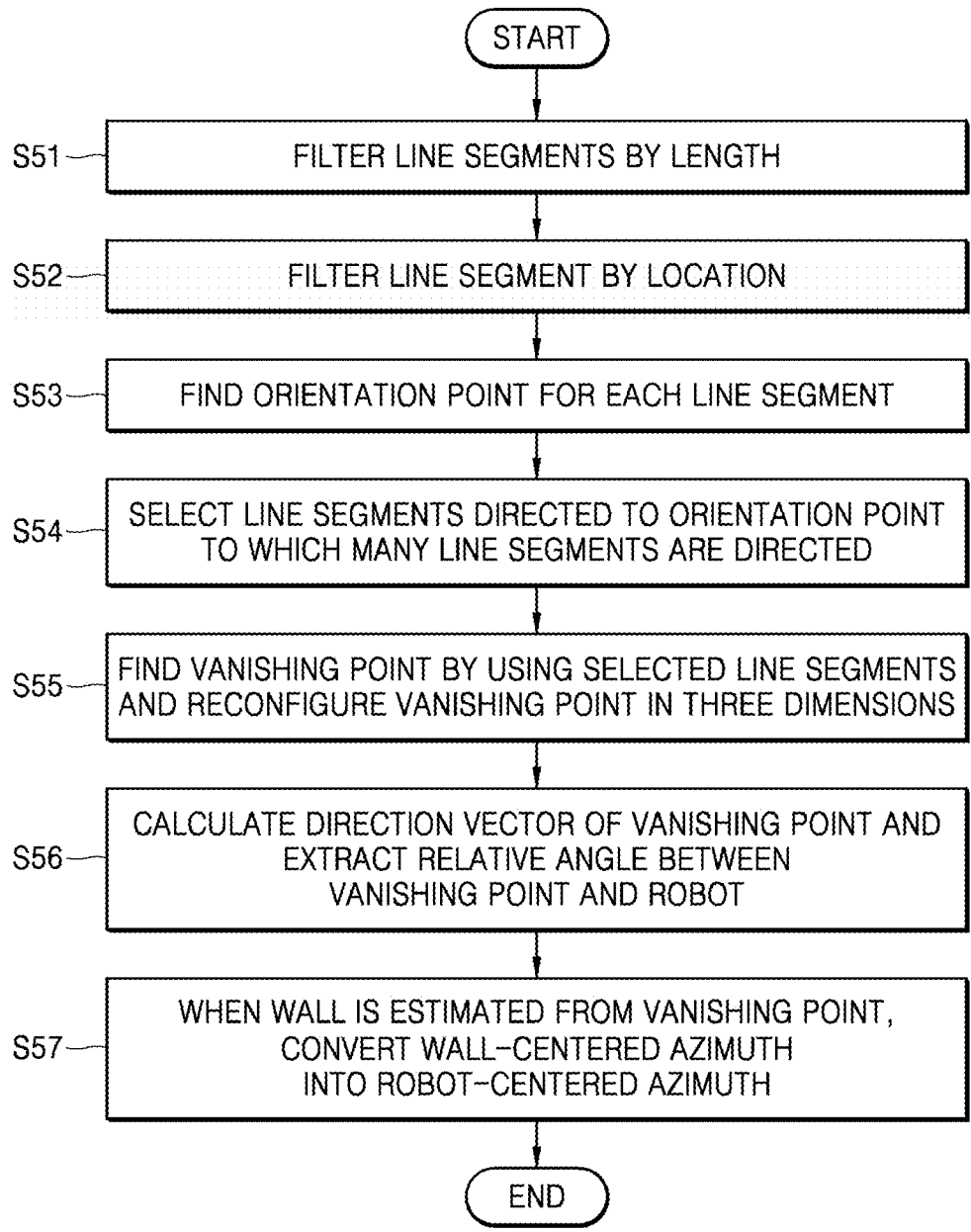
FIG. 8 is a flowchart showing a process of detecting line segments required to estimate a vanishing point in an image according to an embodiment of the present invention.

FIG. 8 is a flowchart showing a process of detecting line segments required to estimate a vanishing point in an image according to an embodiment of the present invention. Since a large number of line segments may be disposed in an image, the image processor 170 selects only line segments necessary to find a vanishing point from among the line segments. To this end, the image processor 170 selects line segments appropriate for finding a vanishing point from among the line segments extracted from the image on the basis of lengths, locations, and orientation points of the line segments and finds a vanishing point on the basis of the selected line segments. This will be described in further detail below.

First, a process in which the image processor 170 removes line segments irrelevant to a vanishing point from an image is described. When many line segments are extracted from the image, the image processor 170 may perform filtering by length of line segments (S51). The image processor 170 may remove very short line segments (e.g., a 15-pixel segment which is short compared to the whole image size) or may not include the segments in segments for finding a vanishing point. This is because very short segments are highly likely to be disposed as noise in the image.

Alternatively, the image processor 170 may perform filtering by location of line segments in the image (S52). This is for the purpose of actually selecting only line segments which are necessary for the robot to estimate an angle, and according to an embodiment, line segments disposed at a lower end, which are not likely to be consulted in a moving process, are removed. For example, line segments disposed in the lower end of about 20% are not likely to be consulted in a moving process. Therefore, the line segments may be removed or not included in line segments for finding a vanishing point.

Subsequently, the image processor 170 finds the orientation point of each of very important or meaningful line segments (S53). In this process, the image processor 170 may select line segments which satisfy the assumption that the space is a Manhattan world. An orientation point denotes a point at which an extending end of a line segment meets another line segment.

When one extending end of a line segment does not meet another line segment, the line segment may be determined to have a low correlation with a vanishing point. Therefore, the image processor 170 selects line segments directed to an orientation point to which many line segments are directed (S54). Then, the image processor 170 finds a vanishing point using the selected line segments and reconfigures the vanishing point in three dimensions.

Subsequently, the image processor 170 calculates the direction vector of the vanishing point and extracts the relative angle between the vanishing point and the robot (S56). In this process, a global angle may be corrected by using the vanishing point, and this may be implemented by extracting an x-axis rotation angle for global angle correction.

Then, an azimuth calculated from a specific wall, which is estimated as a wall on the basis of vanishing point, is converted into a robot-centered azimuth on the basis of the extracted relative angle (S57).

FIG. 9 is a set of views showing a process of deleting unnecessary line segments according to an embodiment of the present invention. In an image 61, small line segments are disposed in a space. When the image 61 is converted into an image 62 by removing short segments or segments disposed at a lower end as shown in S51 and S52 of FIG. 8, it is possible to improve accuracy in estimating a vanishing point.

After removing unnecessary segments, the image processor 170 may estimate a vanishing point on the basis of line segments and calculate the relative angle between the robot and the space.

Figure 10:
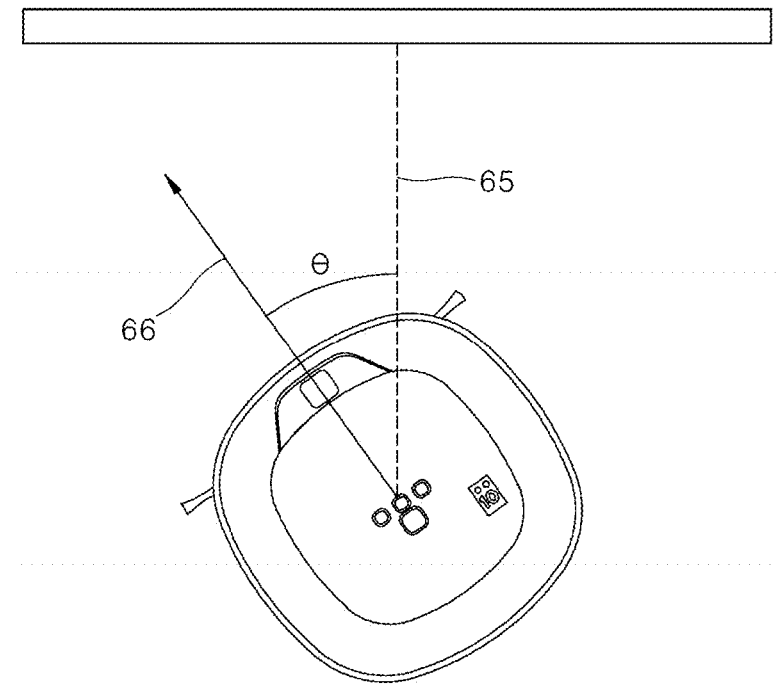
FIG. 10 is a diagram showing the relative angle between a robot and a wall.

FIG. 10 is a diagram showing the relative angle between a robot and a wall. The angle between a straight line 65 along which the robot faces the wall and a current orientation 66 of the robot is a relative angle θ with the wall, and the robot may calculate the relative angle with respect to the wall through angles of line segments related to the vanishing point in the image.

Figure 11:
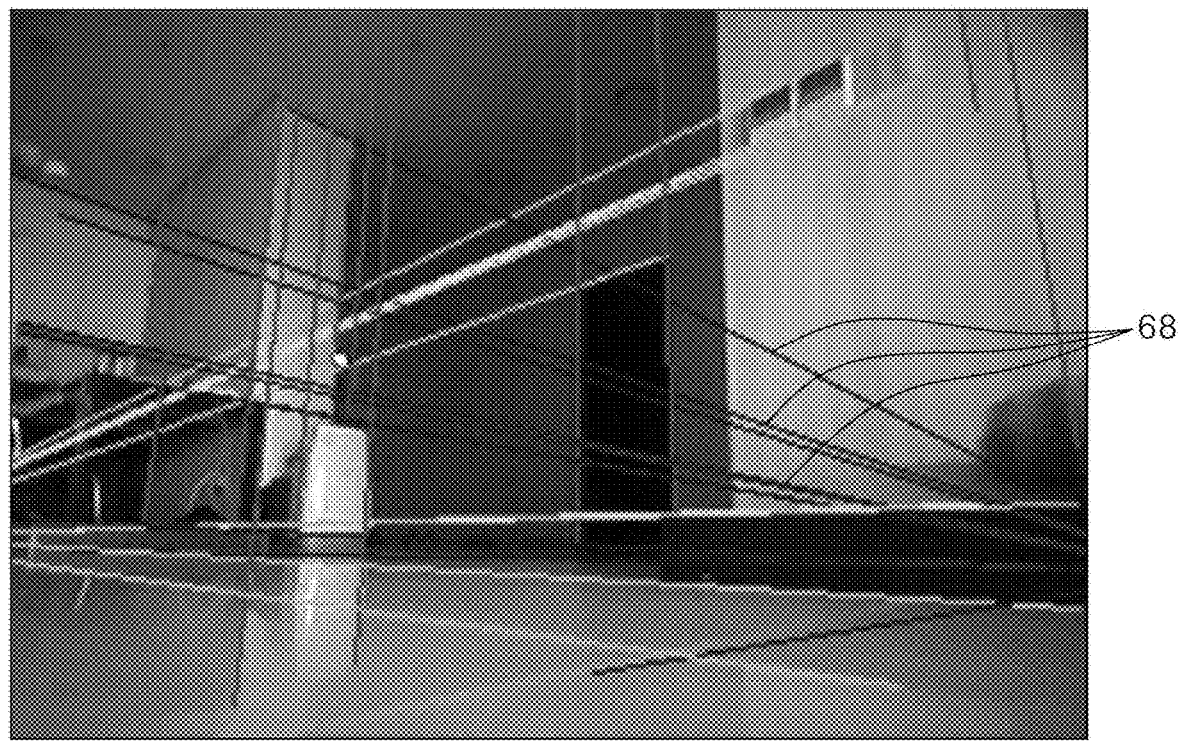
FIG. 11 is an image in which line segments are emphasized to estimate a vanishing point on the basis of line segments in a space according to an embodiment of the present invention.

FIG. 11 is an image in which line segments are emphasized to estimate a vanishing point on the basis of line segments in a space according to an embodiment of the present invention. In the image of FIG. 11, the robot may calculate the relative angle between a wall in a forward space and the robot using straight lines 68 extending from the upper left end to the lower right end. In the structure of FIG. 11, the robot may determine the relative angle to be −44.29 degrees, which may be calculated by comparing the angle of the robot with the line segments 68.

In order to increase the reliability of a vanishing point estimation result, a predetermined number of horizontal segments or more should be present above the optical axis of a camera, and a z-axis (an upward direction of the robot) angle of the estimated vanishing point should be 0 degrees. Also, it is possible to increase the reliability by checking the minimum number of segments for each of the x, y, and z axes.

Figure 12:
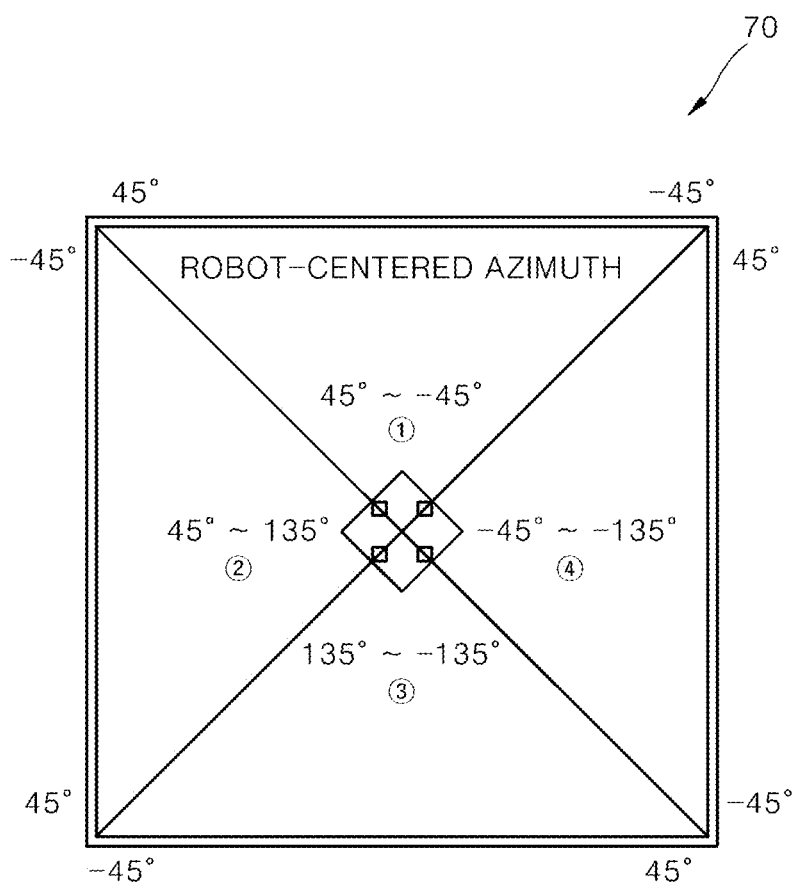

FIGS. 12 and 13 are diagrams showing a process of estimating a global angle on the basis of a vanishing point according to an embodiment of the present invention. In FIG. 11, it has been described that the robot can estimate a vanishing point on the basis of line segments in a space and calculate a relative angle. The robot may estimate the angle thereof by comparing the range of azimuths estimated from the vanishing point with angle information based on the odometry in the driver 130 of the robot.

According to an embodiment, angles of the robot may be classified into four ranges as indicated by 70 of FIG. 12 by using angle information of the odometry. This involves calculating an azimuth on the basis of the center 65 of the wall in FIG. 10. In this way, the robot may classify the four ranges as indicated by 70. The image processor 170 classifies azimuths into the four ranges on the basis of the robot. Also, the image processor 170 first determines which one of the four ranges the azimuth of the robot falls within using the angle information of the odometry.

In an embodiment, the four ranges are obtained by dividing an angle of 360 degrees on the basis of the robot. In other words, since the azimuth of the robot may be −179 degrees to 180 degrees and an azimuth estimated as a vanishing point may be −45 degrees to 45 degrees, the four ranges may be obtained by dividing azimuths of the robot by the size (−45 degrees to 45 degrees) of an azimuth estimated as a vanishing point.

Meanwhile, to calculate the azimuth, the robot may selectively correct tilt angles of the cameras 111, 113, and 115. Tilting denotes correcting an azimuth, which is calculated from a vanishing point, by the image processor 170 according to a difference between the angle of the camera unit 111, 113, or 115 and the angle of the robot. For example, rotation matrix operation may be used to correct a tilt angle. This is shown in FIG. 13.

FIG. 13 shows a process of estimating an azimuth by correcting an upward tilt angle of a forward camera according to an embodiment of the present invention.

$$\begin{bmatrix} {}^wVP1x & {}^wVP2x & {}^wVP3x \\ {}^wVP1y & {}^wVP2y & {}^wVP3y \\ {}^wVP1z & {}^wVP2z & {}^wVP3z \end{bmatrix} = \begin{bmatrix} 1 & 0 & 0 \\ 0 & \cos(tilt) & \sin(tilt) \\ 0 & -\sin(tilt) & \cos(tilt) \end{bmatrix} \begin{bmatrix} {}^cVP1x' & {}^cVP2x' & {}^cVP3x' \\ {}^cVP1y' & {}^cVP2y' & {}^cVP3y' \\ {}^cVP1z' & {}^cVP2z' & {}^cVP3z' \end{bmatrix}$$ [Equation 1]

In Equation 1, a left matrix $^wVP$ indicates a coordinate system of a world-based vanishing point, and a right matrix $^cVP$ indicates a reference coordinate system of the forward camera 115. A tilt angle is input to the central matrix. The tilt angle denotes an angular difference between a camera and a robot. Angles x', y', and z' of the forward camera are corrected into x, y, and z by the rotation matrix of Equation 1. Consequently, the coordinate system is corrected from 71 to 73 as shown in FIG. 13.

After correcting a tilt angle in FIG. 13, the image processor 170 of the robot corrects the azimuth of the robot by applying an azimuth calculated from a vanishing point to the azimuth of the robot differently according to the four ranges when the difference between the azimuth calculated from the vanishing point and the azimuth of the robot is within a preset range.

For example, it is determined which one of sections 1 to 4 shown in FIG. 12 a current azimuth belongs to on the basis of a wall. When the azimuth of the robot is in the section 2 (45 degrees to 135 degrees), the image processor 170 adds 90 degrees to a vanishing point estimation azimuth. When the azimuth of the robot is in the section 3 (135 degrees to −135 degrees), the image processor 170 adds 180 degrees to a vanishing point estimation azimuth. When the azimuth of the robot is in the section 4 (−45 degrees to −135 degrees), the image processor 170 adds 270 degrees to a vanishing point estimation azimuth.

Consequently, it is possible to estimate an absolute angle of the robot based on a Manhattan frame, and only when the difference between the azimuth of the robot before correction and an azimuth corrected with the vanishing point satisfies a predetermined condition (e.g., 20 degrees or less), the corrected azimuth may be adopted for the stability of azimuth correction. This is described in detail with reference to FIG. 14.

FIG. 14 is a set of diagrams showing an azimuth estimation process according to an embodiment of the present invention. Since the robot only rotates about the z-axis as indicated by 75, a vanishing point (VP) having the largest x-axis direction coefficient is selected, and an angular difference from the heading vector of the robot is calculated. For example, as indicated by 77, when the vanishing point is on the left, an angle θ between a heading direction 77h of the robot and a plane vector direction 77p is added, and when the vanishing point is on the right, the angle θ is subtracted. The angle θ of FIG. 14 indicates the difference between a Manhattan frame and the heading of the robot.

FIG. 15 is a set of diagrams showing examples of a space in which a robot of the present invention moves. 78 is a single Manhattan frame space, and 79 is a multi-Manhattan frame space. According to an embodiment, a single Manhattan frame is a right-angle structure in which straight lines in the space cross at one point or meet at a vanishing point. Since spaces which do not orthogonal to each other may be combined together as a multi-Manhattan frame space, it is necessary to correct an angle in the multi-Manhattan frame space. To this end, the robot may use a vanishing point as a landmark. This is described in detail with reference to FIG. 16.

Figure 16:
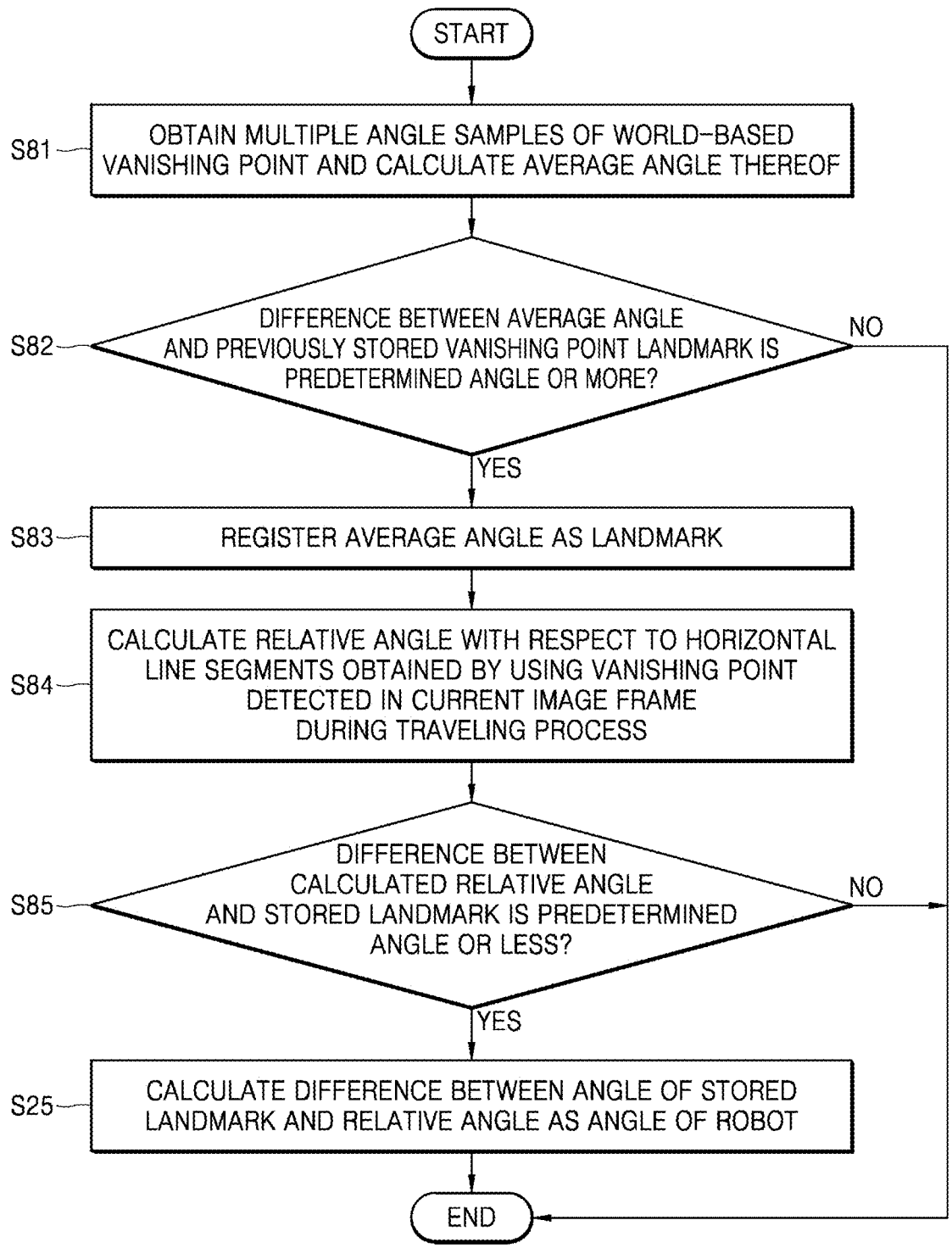
FIG. 16 is a flowchart showing an angle correction process in a multi-Manhattan frame space according to an embodiment of the present invention.

FIG. 16 is a flowchart showing an angle correction process in a multi-Manhattan frame space according to an embodiment of the present invention. Angles which become landmarks of spaces 79a, 79b, and 79c (see FIG. 15) not orthogonal to each other such as a multi-Manhattan frame space are stored so that the robot may compare the angles. To this end, when multiple angle samples of a world-based vanishing point are acquired, the image processor 170 of the robot calculates an angle $^W\bar{\theta}_{VP}$ by averaging the angle samples (S81). For example, an angle obtained by averaging angle samples of a vanishing point calculated in 79a of FIG. 15 may differ from an angle obtained by averaging angle samples of a vanishing point calculated in 79b of FIG. 15. Therefore, the image processor 170 compares an average angle with a previously stored vanishing point landmark and stores the average angle $^W\bar{\theta}_{VP}$ as a new landmark when the difference between the average angle and the previously stored vanishing point landmark is a predetermined angle or more (S83).

Subsequently, the robot calculates a relative angle $_R^M\theta_{VP,k}$ with respect to horizontal segments, which are obtained by using a vanishing point detected in a current image frame during a traveling process (S84). This denotes a relative angle newly acquired by the robot. This angle is compared with the landmark stored in step S83. In other words, when the difference between the calculated relative angle and the stored landmark is a predetermined angle or less (S85), it is determined that the stored landmark has been detected in the current image frame. Consequently, a current angle $^W\bar{\theta}_{R,k}$ of the robot may be calculated by Equation 2. According to Equation 2, the difference between the angle of a stored landmark and a relative angle is calculated as the angle of the robot.

$$^W\theta_{R,k} = {}^W\bar{\theta}_{VP} - {}_R^M\theta_{VP,k}$$ [Equation 2]

Operation in the multiple Manhattan structures of FIGS. 15 and 16 is summarized as follows. In the multiple Manhattan structures, the individual spaces 79a, 79b, and 79c which are not orthogonally connected together are each designated as landmarks, and average angles of vanishing points calculated from these spaces are separately stored. When a vanishing point is calculated in a moving process of the robot, it is determined whether the difference between the calculated vanishing point and a stored average angle of a landmark is a predetermined value or less. When the difference is the predetermined value or less, the robot determines that it is in the space of the landmark.

For example, the robot is assumed to have arrived at 79c in a process of moving to 79a, 79b, and 79c. In this case, the robot has stored the angle of a vanishing point using the space indicated by 79a as a landmark and also has stored the angle of a vanishing point using the space indicated by 79b as a landmark.

The image processor 170 calculates the average angle of a vanishing point and calculates the difference between the calculated average angle and the vanishing point angle of one or more landmarks 79a and 79b stored in the storage 180. When the difference is a preset first difference value (e.g., 30 degrees) or more, the image processor 170 determines that the robot has entered a space distinguished by a new landmark. Consequently, the image processor 170 stores the calculated average angle of a vanishing point in the storage 180 together with indication information of the new landmark (information required for distinguishing 79c from 79a and 79b).

Also, in a moving process of the robot, the average angle of a vanishing point is calculated from images, and the difference between the calculated average angle and the vanishing point angle of at least one landmark stored in the storage 180 is calculated. When the calculated difference is a preset second difference value (e.g., 30 degrees) or less, it is determined that the robot has moved to a space indicated by the landmark. In other words, it is determined that the landmark has been detected in a first image, and the angle of the robot may be estimated.

The average vanishing point angle of each of partial areas which are not orthogonal to each other in a space is stored so that the robot may not generate an error in a process of estimating a vanishing point of the space. When a similar average vanishing point angle is calculated to be within a preset range, it is determined that the robot has moved to a corresponding area. When a calculated average vanishing point angle is not similar to the average vanishing point angle of a partial area, it is determined that the robot has moved to a new area, and it is possible to cope with the multi-Manhattan frame structure.

Figure 17:
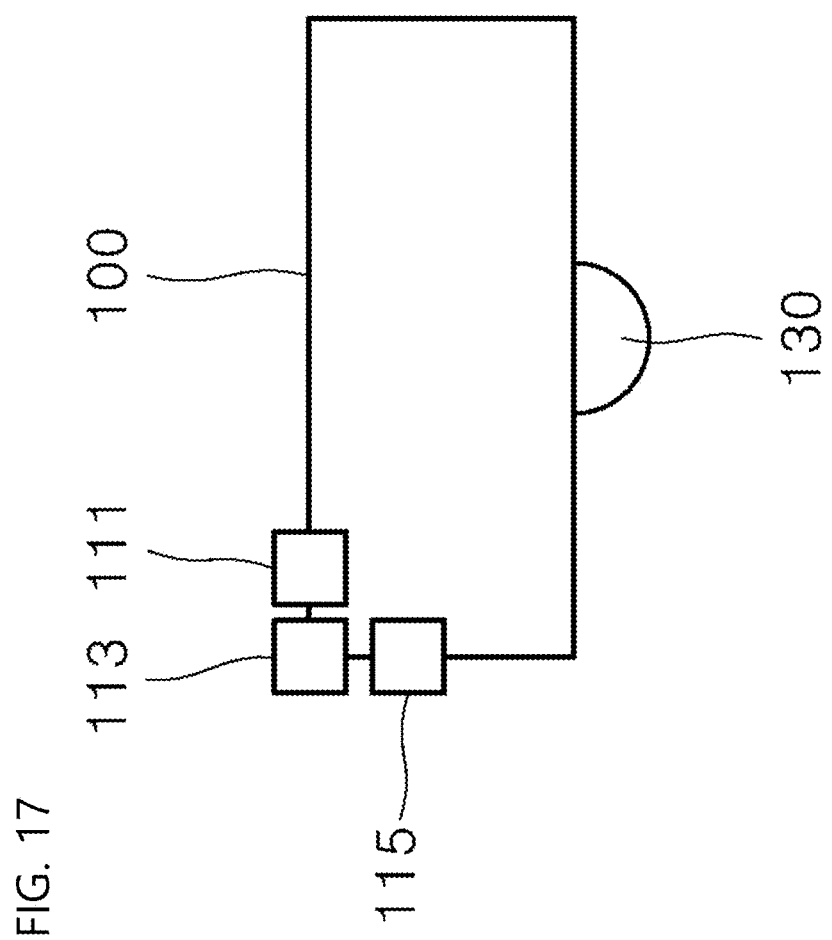
FIG. 17 is a diagram showing cameras disposed on a robot according to an embodiment of the present invention.

FIG. 17 is a diagram showing cameras disposed on a robot according to an embodiment of the present invention. As described above with reference to FIG. 2, the upward camera 111 is disposed in an upward direction of the robot, the forward-upward camera 113 is disposed in a forward-upward direction of the robot, and the forward camera 115 for imaging in a travel direction of the robot is disposed.

The upward camera 111 captures a bottom-up image from the robot and finds a vanishing point using line segments disposed close to a ceiling. Since the ceiling is an area which is orthogonal to the z-axis, the robot may easily find a vanishing point by finding line segments in the x-axis or y-axis.

The forward-upward camera 113 captures an image disposed above the travel direction of the robot. It is possible to find a vanishing point by using line segments disposed in the ceiling and an upper portion of a front in the travel direction.

The forward camera 115 captures an image of objects disposed in the travel direction of the robot. The forward camera 115 may photograph a wall disposed on the floor, and it is possible to find a vanishing point using line segments in a region where the wall meets the floor.

The three types of cameras of FIG. 17 may be selectively disposed according to an operating method or movement speed of the robot or spatial characteristics. For example, when the robot has a high height, the floor and the ceiling may not be included in an image captured by the forward camera 115. To solve this problem, the forward-upward camera 113 may be disposed in the robot. On the other hand, when the robot has a low height, the forward camera 115 is disposed so that the floor may be included in a captured image. Also, both or either of the forward-upward camera 113 and the upward camera 111 may be disposed on the robot.

Although all elements constituting embodiments of the present invention have been described to be combined together or to operate in combination, the present invention is not necessarily limited to these embodiments, and one or more of all the elements may be selectively combined to operate within the scope of the present invention. Also, all the elements may be separately implemented as independent pieces of hardware, but all or some of the elements may be selectively combined and implemented as a computer program having a program module which executes some or all functions combined from one or more pieces of hardware. Codes and code segments constituting the computer program may be readily inferred by those of ordinary skill in the technical field of the present invention. This computer program is stored in a computer-readable media and read and executed by a computer so that embodiments of the present invention may be implemented. Storage media of the computer program include a magnetic recording medium, an optical recording medium, and a semiconductor recording device. Also, the computer program for implementing embodiments of the present invention includes a program module which is transmitted in real time through an external device.

Although the present invention has been described above with reference to embodiments, various modifications or alterations can be made by those of ordinary skill in the art. Therefore, these modifications or alterations are construed as being within the category of the present invention as long as not deviating from the scope of the present invention.

REFERENCE SIGNS LIST

100: robot
111: upward camera
113: forward-upward camera
115: forward camera
130: driver
160: AOFS processor
170: image processor
180: storage

What is claimed is:

1. A robot for estimating an orientation based on a vanishing point in a low-luminance image, the robot comprising:
 a driver configured to move the robot;
 a camera configured to capture an image of at least one of a forward area or an upward area with respect to the robot;
 an image processor configured to extract line segments from a first image captured by the camera by applying histogram equalization and a rolling guidance filter to the first image, calculate the vanishing point based on the line segments, and estimate a global angle of the robot corresponding to the vanishing point;

at least one controller configured to control the driver, the camera, and the image processor; and a storage memory configured to store a vanishing point angle of at least one landmark in a space, wherein the image processor is further configured to:

calculate an average angle of the vanishing point;

calculate a difference between the average angle and the vanishing point angle of the at least one landmark;

store the average angle in the storage memory based on the difference being equal to or greater than a first difference value; and determine that the at least one landmark has been detected in the first image based on the difference being equal to or less than a second difference value.

2. The robot of claim 1, further comprising an afocal optical flow sensor (AOFS) processor configured to sense a change in a floor material of an area to which the driver moves, correct a slipping of the robot caused by the change, and estimate a travel distance of the robot.

3. The robot of claim 1, wherein the image processor is further configured to generate a second image by equalizing a histogram of the first image and generate a third image in which line segments of the third image are emphasized by applying the rolling guidance filter to the second image.

4. The robot of claim 3, wherein the image processor is further configured to select some of line segments extracted from the third image based on lengths, locations, and orientation points of the line segments of the third image and find the vanishing point based on the selected line segments.

5. The robot of claim 4, wherein the image processor is further configured to classify azimuths into four ranges based on the robot and determine that an azimuth of the robot is within the four ranges, and wherein the image processor is further configured to apply an azimuth calculated from the vanishing point to the azimuth of the robot differently according to the four ranges when a difference between the azimuth calculated from the vanishing point and the azimuth of the robot is within a particular range.

6. The robot of claim 1, wherein the image processor is further configured to correct an azimuth calculated from the vanishing point according to a difference between an angle of the camera and an angle of the robot.

7. A method for a mobile robot to estimate an orientation based on a vanishing point in a low-luminance image, the method comprising:

capturing, by a camera, an image of at least one of a forward area or an upward area with respect to the robot;

applying, by an image processor, histogram equalization and a rolling guidance filter to a first image captured by the camera to extract line segments from the first image;

calculating, by the image processor, the vanishing point by using the line segments and estimating a global angle of the robot corresponding to the vanishing point;

calculating, by the image processor, an average angle of the vanishing point;

calculating a difference between the average angle and a vanishing point angle of at least one landmark in a space stored in a storage memory, which is configured to store the vanishing point angle of the at least one landmark;

storing the average angle in the storage memory based on the difference being equal to or greater than a first difference value; and determining that the at least one landmark has been detected in the first image based on the difference being equal to or less than a second difference value.

8. The method of claim 7, further comprising:

sensing, by an afocal optical flow sensor (AOFS) processor of the robot, a change in a floor material of an area to which the robot moves; and correcting, by the AOFS processor, a slipping of the robot caused by the sensed change to estimate a travel distance of the robot.

9. The method of claim 7, further comprising:

generating, by the image processor, a second image by equalizing a histogram of the first image; and generating, by the image processor, a third image in which line segments of the third image are emphasized by applying the rolling guidance filter to the second image.

10. The method of claim 9, further comprising:

selecting, by the image processor, some of line segments extracted from the third image based on lengths, locations, and orientation points of the line segments of the third image; and finding, by the image processor, the vanishing point based on the selected line segments.

11. The method of claim 10, further comprising:

classifying, by the image processor, azimuths into four ranges based on the robot and determining that an azimuth of the robot is within the four ranges; and applying, by the image processor, an azimuth calculated from the vanishing point to the azimuth of the robot differently according to the four ranges when a difference between the azimuth calculated from the vanishing point and the azimuth of the robot is within a particular range.

12. The method of claim 7, further comprising correcting, by the image processor, an azimuth calculated from the vanishing point according to a difference between an angle of the camera and an angle of the robot.

13. An image processing apparatus disposed in a robot to estimate an orientation of the robot based on a vanishing point in a low-luminance image, the image processing apparatus comprising:

a camera configured to capture an image of at least one of a forward area or an upward area with respect to the robot;

an image processor configured to extract line segments from a first image captured by the camera by applying histogram equalization and a rolling guidance filter to the first image, calculate the vanishing point based on the line segments, and estimate a global angle of the robot corresponding to the vanishing point;

at least one controller configured to control the camera and the image processor; and a storage memory configured to store a vanishing point angle of at least one landmark in a space, wherein the image processor is further configured to:

calculate an average angle of the vanishing point;

calculate a difference between the average angle and the vanishing point angle of the at least one landmark;

store the average angle in the storage memory based on the difference being equal to or greater than a first difference value; and determine that the at least one landmark has been detected in the first image based on the difference being equal to or less than a second difference value.

14. The image processing apparatus of claim 13, further comprising an afocal optical flow sensor (AOFS) processor configured to sense a change in a floor material of an area to which the robot moves, correct a slipping of the robot caused by the change, and estimate a travel distance of the robot.

15. The image processing apparatus of claim 13, wherein the image processor is further configured to generate a second image by equalizing a histogram of the first image and generate a third image in which line segments of the third image are emphasized by applying the rolling guidance filter to the second image.

16. The image processing apparatus of claim 15, wherein the image processor is further configured to select some of line segments extracted from the third image based on lengths, locations, and orientation points of the line segments of the third image and find the vanishing point based on the selected line segments.

17. The image processing apparatus of claim 13, wherein the image processor is further configured to correct an azimuth calculated from the vanishing point according to a difference between an angle of the camera and an angle of the robot.

* * * * *